US012376704B1

(12) United States Patent
Hastings et al.

(10) Patent No.: US 12,376,704 B1
(45) Date of Patent: Aug. 5, 2025

(54) MULTIFUNCTIONAL PORTABLE GRINDER WITH INTEGRATED LIGHTER HOLDER AND RETRACTABLE MECHANISM

(71) Applicant: Bar Products.com, Inc., Largo, FL (US)

(72) Inventors: Mark S. Hastings, Indian Rocks Beach, FL (US); Hai Pin Tsai, Kowloon (HK)

(73) Assignee: Bar Products.com, Inc., Largo, FL (US)

( * ) Notice: Subject to any disclaimer, the term of this patent is extended or adjusted under 35 U.S.C. 154(b) by 0 days.

(21) Appl. No.: 18/769,787

(22) Filed: Jul. 11, 2024

(51) Int. Cl.
| A47J 42/14 | (2006.01) |
| A47J 42/20 | (2006.01) |
| A47J 42/30 | (2006.01) |
| A47J 42/34 | (2006.01) |
| A47J 42/38 | (2006.01) |
| A47J 42/40 | (2006.01) |

(52) U.S. Cl.
CPC ............... *A47J 42/14* (2013.01); *A47J 42/20* (2013.01); *A47J 42/30* (2013.01); *A47J 42/34* (2013.01); *A47J 42/38* (2013.01); *A47J 42/40* (2013.01)

(58) Field of Classification Search
CPC .. A47J 42/14; A47J 42/20; A47J 42/30; A47J 42/34; A47J 42/40; A47J 42/50; A47J 42/38
See application file for complete search history.

(56) References Cited

U.S. PATENT DOCUMENTS

| 3,979,001 | A | * | 9/1976 | Bogert | B65D 50/043 215/217 |
| 4,927,354 | A | * | 5/1990 | Sanford | F23Q 2/34 206/87 |
| 6,382,481 | B1 | * | 5/2002 | McIlmoil | A45F 5/004 224/245 |
| 6,913,157 | B2 | * | 7/2005 | Oh | B65D 41/04 220/296 |
| 7,331,479 | B2 | * | 2/2008 | Oh | B65D 41/06 215/331 |
| D573,492 | S | * | 7/2008 | Tsai | D10/72 |
| 7,469,794 | B2 | * | 12/2008 | Krueger | B65D 50/043 215/217 |
| D654,781 | S | * | 2/2012 | Tsai | D8/359 |
| 8,672,249 | B2 | * | 3/2014 | Scharf | A47J 43/25 241/95 |
| 9,192,194 | B2 | * | 11/2015 | Fakhouri | A24F 9/00 |
| 9,249,814 | B2 | * | 2/2016 | Tsai | F16B 45/008 |
| 9,717,323 | B2 | * | 8/2017 | Tsai | F16B 2/20 |
| 11,224,311 | B2 | * | 1/2022 | Aryanpanah | A47J 42/34 |

(Continued)

*Primary Examiner* — Christopher L Templeton
*Assistant Examiner* — Matthew Stephens
(74) *Attorney, Agent, or Firm* — Nicholas Pfeifer; Smith & Hopen, P. A.

(57) ABSTRACT

A multifunctional portable device that integrates a grinder with a lighter holder and retractable tether mechanism. This compact and easily portable form factor provides users with both a grinding tool and a readily accessible lighter. The device includes a carabiner clip for attachment, a grinder cap with unique grinding blades and apertures, a swivel mechanism, a retractable cord, and a lighter holder. The innovative threading and the magnetic pillar of the grinder allow the grinder cap to rotate freely for grinding without detaching from the base, enhancing the device's efficiency and usability.

6 Claims, 13 Drawing Sheets

(56) References Cited

U.S. PATENT DOCUMENTS

| | | | | |
|---|---|---|---|---|
| 11,712,700 | B1* | 8/2023 | Henderson | A47J 42/34 241/168 |
| 11,737,603 | B1* | 8/2023 | Qutami | A47J 42/38 241/28 |
| D1,012,485 | S* | 1/2024 | Tsai | D3/215 |
| 2003/0121877 | A1* | 7/2003 | Brozell | B65D 50/043 215/346 |
| 2003/0160020 | A1* | 8/2003 | Oh | B65D 41/04 215/330 |
| 2011/0068026 | A1* | 3/2011 | Fakhouri | A24F 9/04 29/700 |
| 2012/0097774 | A1* | 4/2012 | Hainbach | A47J 42/50 241/101.2 |
| 2013/0213416 | A1* | 8/2013 | Ahmet | A24F 13/00 131/290 |
| 2013/0306779 | A1* | 11/2013 | Tsai | B65H 75/48 242/371 |
| 2014/0217213 | A1* | 8/2014 | Edwards | A47J 42/38 241/91 |
| 2017/0319009 | A1* | 11/2017 | Seckel | A47J 42/12 |
| 2018/0199759 | A1* | 7/2018 | Qiu | A47J 42/20 |
| 2018/0332892 | A1* | 11/2018 | Beaver | B65D 85/08 |
| 2019/0016510 | A1* | 1/2019 | Woodley | B65D 41/34 |
| 2020/0187717 | A1* | 6/2020 | Pagan | A47J 42/34 |
| 2022/0071448 | A1* | 3/2022 | Hansen | A47J 42/24 |
| 2023/0027095 | A1* | 1/2023 | Ashton | A47J 42/36 |
| 2023/0119991 | A1* | 4/2023 | Lei | B65D 50/041 220/298 |

* cited by examiner

MULTIFUNCTIONAL PORTABLE GRINDER WITH INTEGRATED LIGHTER HOLDER AND RETRACTABLE MECHANISM

BACKGROUND OF THE INVENTION

Field of the Invention

This invention relates, generally, to the field of portable multifunctional tools, and more particularly to a device that integrates a grinder with a lighter holder and a retractable tether mechanism.

Brief Description of the Prior Art

In various outdoor and everyday settings, users often require a grinder and a lighter for preparing and consuming materials such as herbs and tobacco. Traditional grinders and lighters are separate items, which can be inconvenient to carry and manage. There is a need for a multifunctional device that combines these tools in a compact and portable form, ensuring that both the grinder and lighter are always readily accessible.

Additionally, existing herb grinders lack innovative features that enhance functionality and ease of use. Thus, there is also a need for an improved grinder design. This invention addresses both needs by integrating a high-efficiency grinder with a lighter holder and a retractable tether mechanism, providing a practical and user-friendly solution. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, the applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The present invention relates to a multifunctional portable device that integrates a grinder with a lighter holder and a retractable tether mechanism. One embodiment of the device includes a lighter housing configured to receive a lighter, a retractable cord secured to a reel mechanism and to the lighter housing, a reel housing configured to house the reel mechanism, a grinder attached to the reel housing, and a clip for securing the device to an object. The reel housing may further include a cylindrical extension with external threads for attaching the grinder or additional components to the device.

The grinder comprises a grinder cap and a grinder body, with the cap configured to rotate relative to the grinder body. In some embodiments, the grinder cap includes a cylindrical wall with a thread located on an inner surface of the cylindrical wall. The thread extends partially along a length of the inner surface of the wall thereby establishing a thread-free section. Likewise, the grinder body includes a cylindrical wall with a thread located on an outer surface of the cylindrical wall. The thread on the grinder body also extends partially along a length of the outer surface of the wall thereby establishing a thread-free section. The grinder cap is configured to be threaded onto the grinder body, and continued rotation in a first direction enables the thread on the grinder cap to reach the thread-free section on the grinder body and the thread on the grinder body to reach the thread-free section on the grinder cap. As a result, the grinder cap can rotate freely relative to the grinder body without the thread on the grinder cap engaging the thread on the grinder body. Some embodiments also include a magnetic pillar within the grinder body that magnetically attracts the grinder cap. The magnetic attraction ensures that the thread on the grinder cap remains in the thread-free section on the grinder body and the thread on the grinder body remains in the thread-free section on the grinder cap.

In some embodiments, the thread-free section on the grinder body has a length that is greater than a thread length of the thread on the grinder cap. Likewise, the thread-free section on the grinder cap can have a length that is greater than a thread length of the thread on the grinder body.

Some embodiments further include a plurality of upper grinding blades in the grinder cap and a plurality of lower grinding blades in the grinder body. Each upper grinding blade has a tower-shaped body with vertical sides equipped with teeth that extend along the height of the blade and catchments between the teeth. Each lower grinding blade also has a tower-shaped body with vertical sides equipped with teeth that extend along the height of the blade and catchments between the teeth. The upper grinding blades and lower grinding blades are arranged to operably compress and grind material into fragments during rotation of the grinder cap relative to the grinder body.

In some cases, the plurality of upper grinding blades includes a first set of upper grinding blades and a second set of upper grinding blades. The first set is arranged in a first circular pattern around a center of the grinder cap with the first set of upper grinding blades comprised of three pairs of two interconnected blades equidistantly spaced about the circular pattern. The second set of upper grinding blades is arranged in a second circular pattern around the center of the grinder cap with the second set of upper grinding blades comprised of three pairs of two interconnected blades equidistantly spaced about the second circular pattern. In addition, each pair of blades in the first set of upper grinding blades is radially aligned with one of the pairs of blades in the second set of upper grinding blades.

In some embodiments, the grinding body includes a set of lower grinding blades arranged in a third circular pattern around a center of the grinder body with the set of lower grinding blades having three pairs of two interconnected blades equidistantly spaced about the third circular pattern, a set of wall blades equidistantly spaced about a circumference of a cylindrical wall of the grinder body.

The grinder body also includes a first set of apertures arranged in a fourth circular pattern around the center of the grinder body and a second set of apertures arranged in a fifth circular pattern around the center of the grinder body. In some embodiments, each aperture in the first set of apertures and the second set of apertures are non-circular and each aperture in the first set of apertures is larger than each aperture in the second set of apertures.

The present invention also relates to a grinder design having a grinder cap configured to rotate relative to a grinder body. In some embodiments, the grinder cap includes a cylindrical wall with a thread located on an inner surface of the cylindrical wall. The thread extends partially along a length of the inner surface of the wall thereby establishing a thread-free section. Likewise, the grinder body includes a cylindrical wall with a thread located on an outer surface of the cylindrical wall. The thread on the grinder body also extends partially along a length of the outer surface of the wall thereby establishing a thread-free section. The grinder cap is configured to be threaded onto the grinder body, and continued rotation in a first direction enables the thread on the grinder cap to reach the thread-free section on the grinder body and the thread on the grinder body to reach the thread-free section on the grinder cap. As a result, the grinder cap can rotate freely relative to the grinder body without the thread on the grinder cap engaging the thread on the grinder body. Some embodiments also include a magnetic pillar within the grinder body that magnetically attracts the grinder cap. The magnetic attraction ensures that the thread on the grinder cap remains in the thread-free section on the grinder body and the thread on the grinder body remains in the thread-free section on the grinder cap.

In some embodiments, the grinder of the present invention includes a plurality of upper grinding blades in the grinder cap and a plurality of lower grinding blades in the grinder body. Each upper grinding blade has a tower-shaped body with vertical sides equipped with teeth that extend along the height of the blade and catchments between the teeth. Each lower grinding blade also has a tower-shaped body with vertical sides equipped with teeth that extend along the height of the blade and catchments between the teeth. The upper grinding blades and lower grinding blades are arranged to operably compress and grind material into fragments during rotation of the grinder cap relative to the grinder body.

In some cases, the plurality of upper grinding blades includes a first set of upper grinding blades and a second set of upper grinding blades. The first set is arranged in a first circular pattern around a center of the grinder cap with the first set of upper grinding blades comprised of three pairs of two interconnected blades equidistantly spaced about the circular pattern. The second set of upper grinding blades is arranged in a second circular pattern around the center of the grinder cap with the second set of upper grinding blades include three pairs of two interconnected blades equidistantly spaced about the second circular pattern. In addition, each pair of blades in the first set of upper grinding blades is radially aligned with one of the pairs of blades in the second set of upper grinding blades.

In some embodiments, the grinding body includes a set of lower grinding blades arranged in a third circular pattern around a center of the grinder body with the set of lower grinding blades having three pairs of two interconnected blades equidistantly spaced about the third circular pattern, a set of wall blades equidistantly spaced about a circumference of a cylindrical wall of the grinder body, a first set of apertures arranged in a fourth circular pattern around the center of the grinder body, and a second set of apertures arranged in a fifth circular pattern around the center of the grinder body. In some embodiments, each aperture in the first set of apertures and the second set of apertures are non-circular and each aperture in the first set of apertures is larger than each aperture in the second set of apertures.

The grinder of the present invention may be configured to temporarily attach to a multifunctional portable device having a lighter housing configured to receive a lighter, a retractable cord secured to a reel mechanism and to the lighter housing, a reel housing configured to house the reel mechanism, and a clip attached to the reel housing for securing the device to an object.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
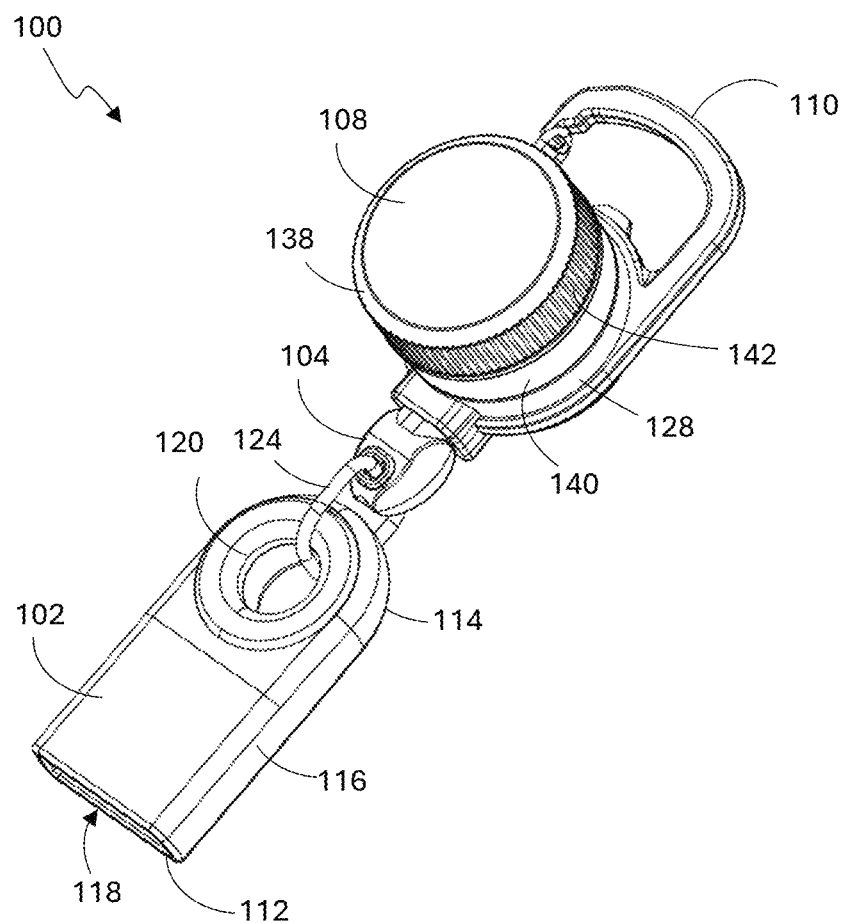
FIG. 1 is a perspective view of an embodiment of the multifunctional portable device, showing the integrated grinder cap, carabiner clip, retractable cord, and lighter holder.
Figure 2:
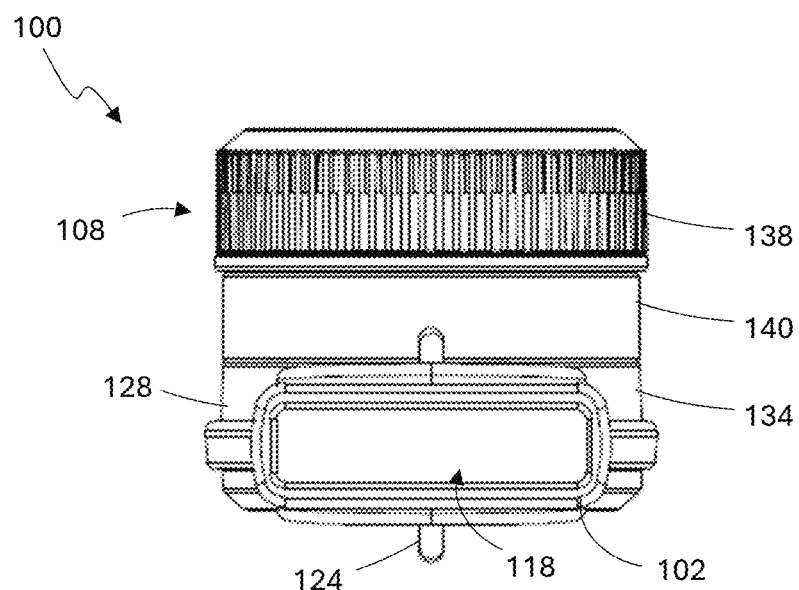
FIG. 2 is a front view of the embodiment depicted in FIG. 1.
Figure 3:
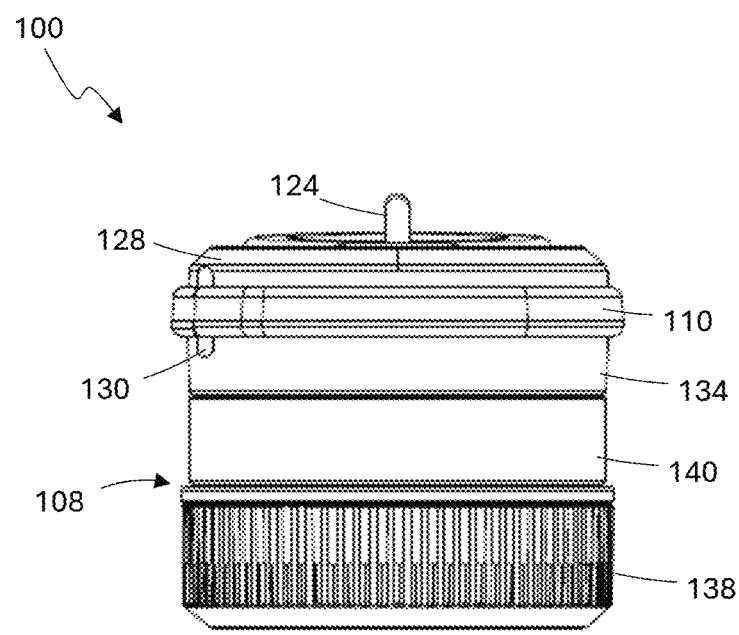
FIG. 3 is a rear view of the embodiment depicted in FIG. 1.
Figure 4:
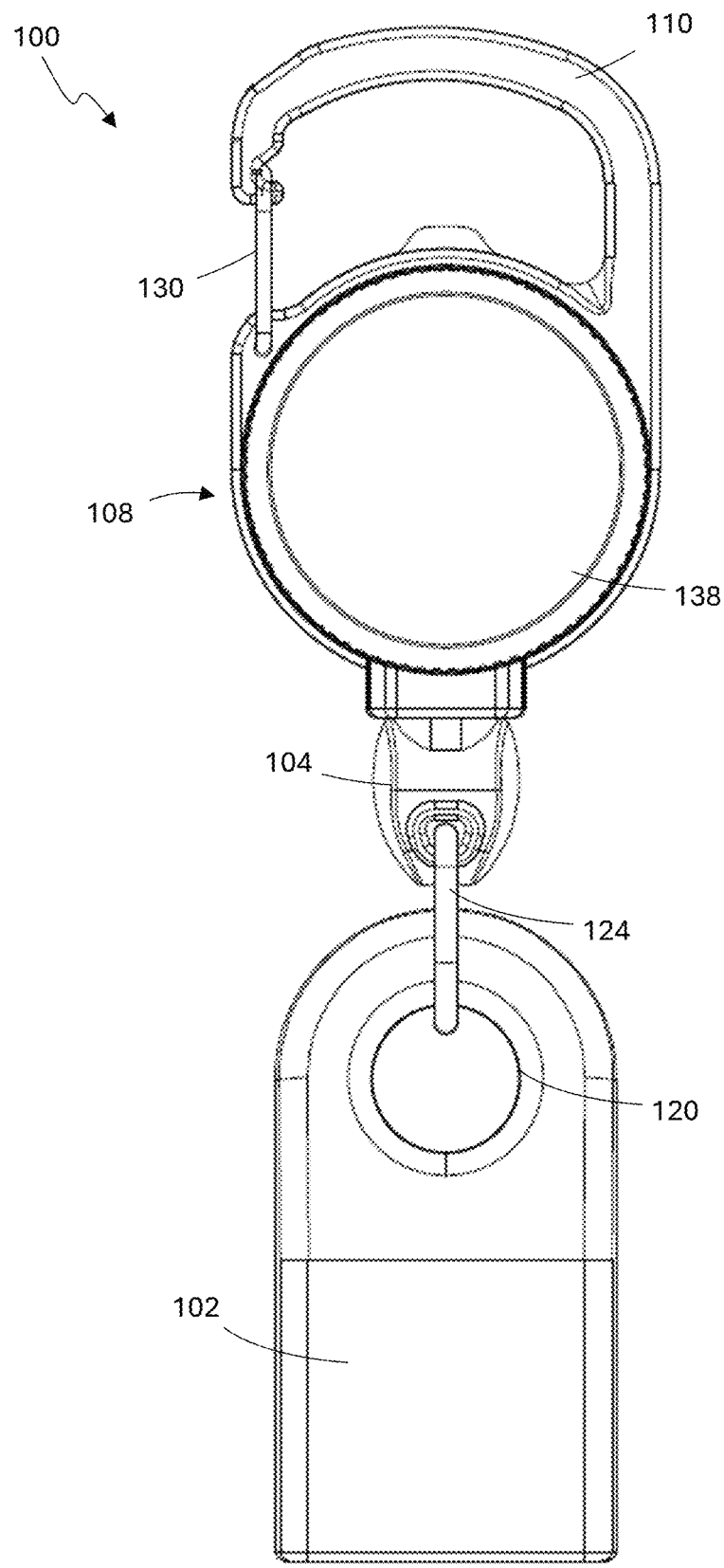
FIG. 4 is a top view of the embodiment depicted in FIG. 1.
Figure 5:
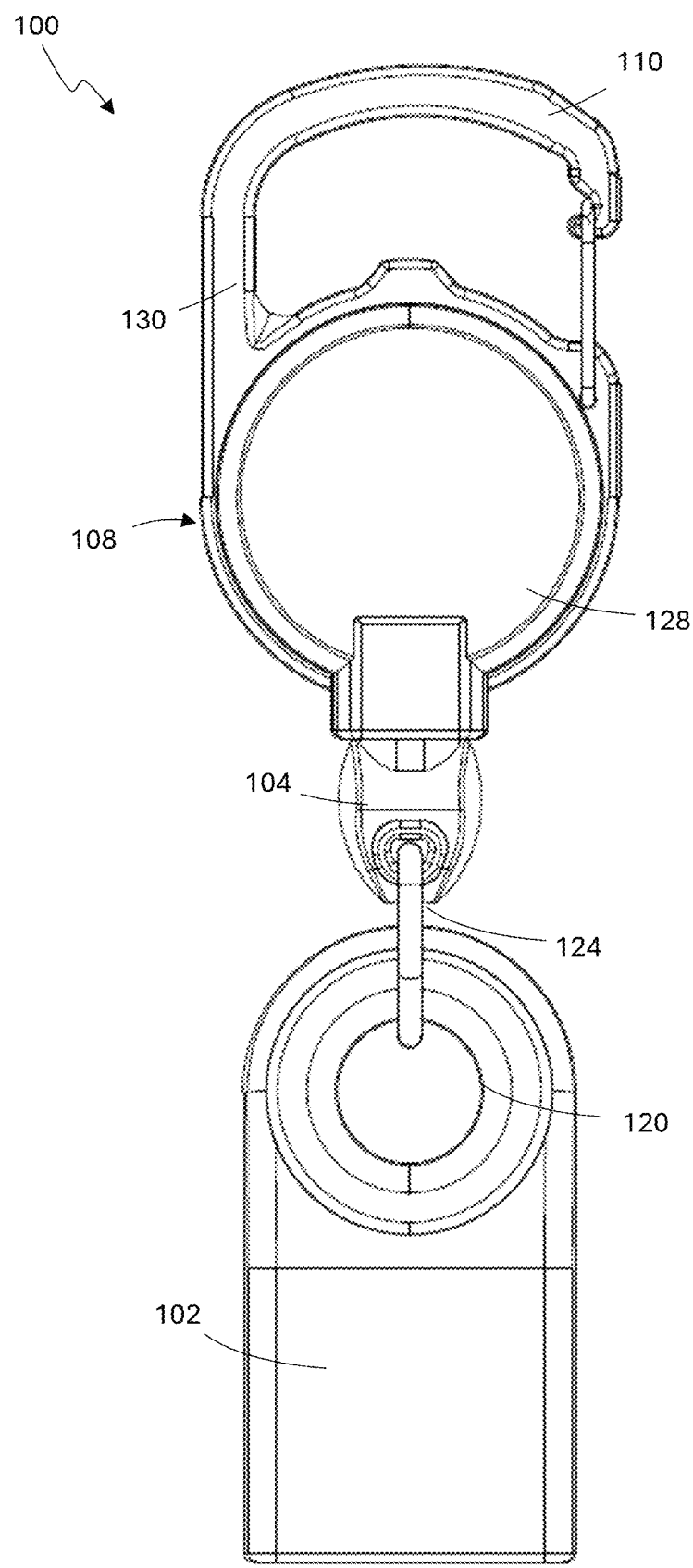
FIG. 5 is a bottom view of the embodiment depicted in FIG. 1.
Figure 6:
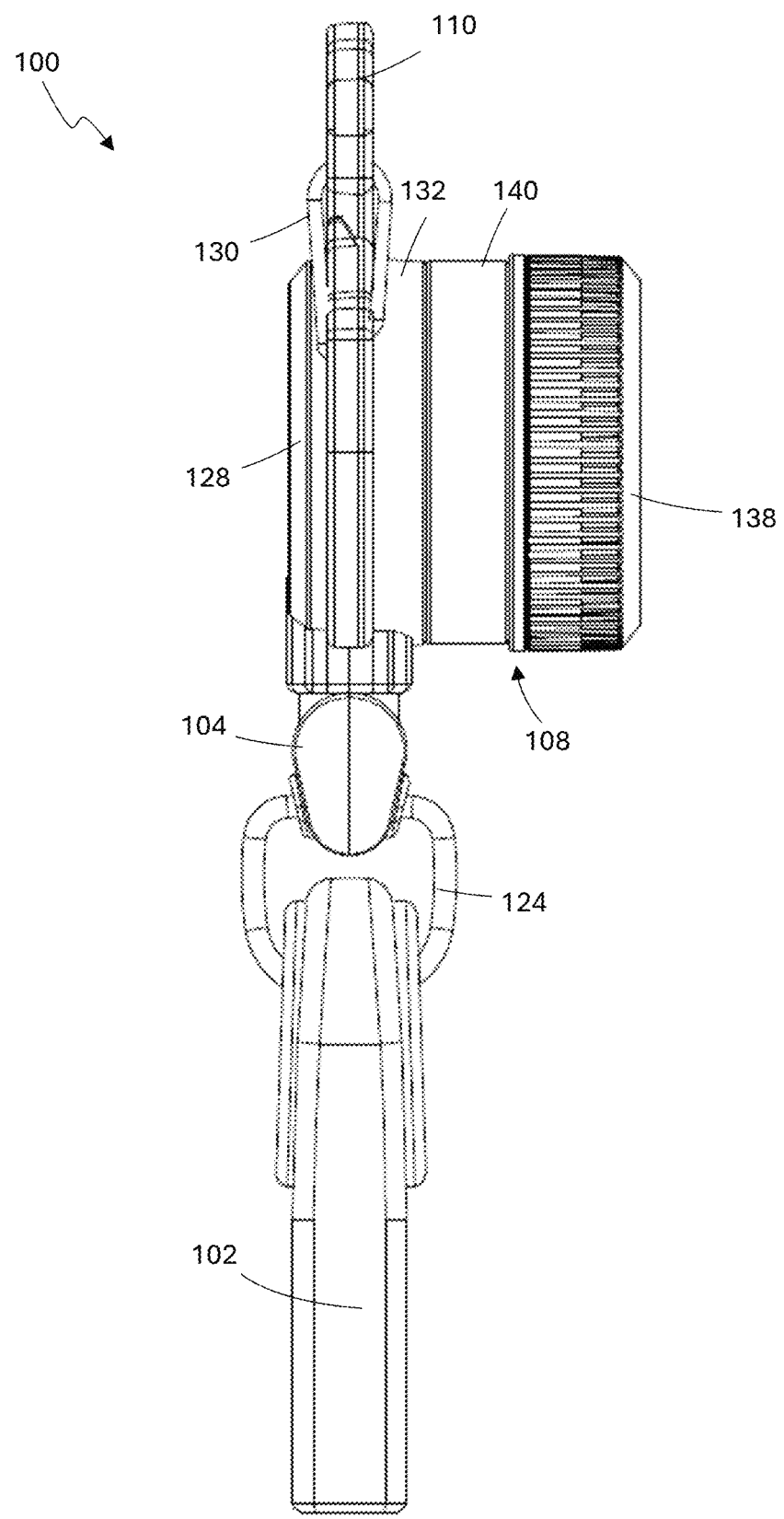
FIG. 6 is a side view of the embodiment depicted in FIG. 1.
Figure 7:
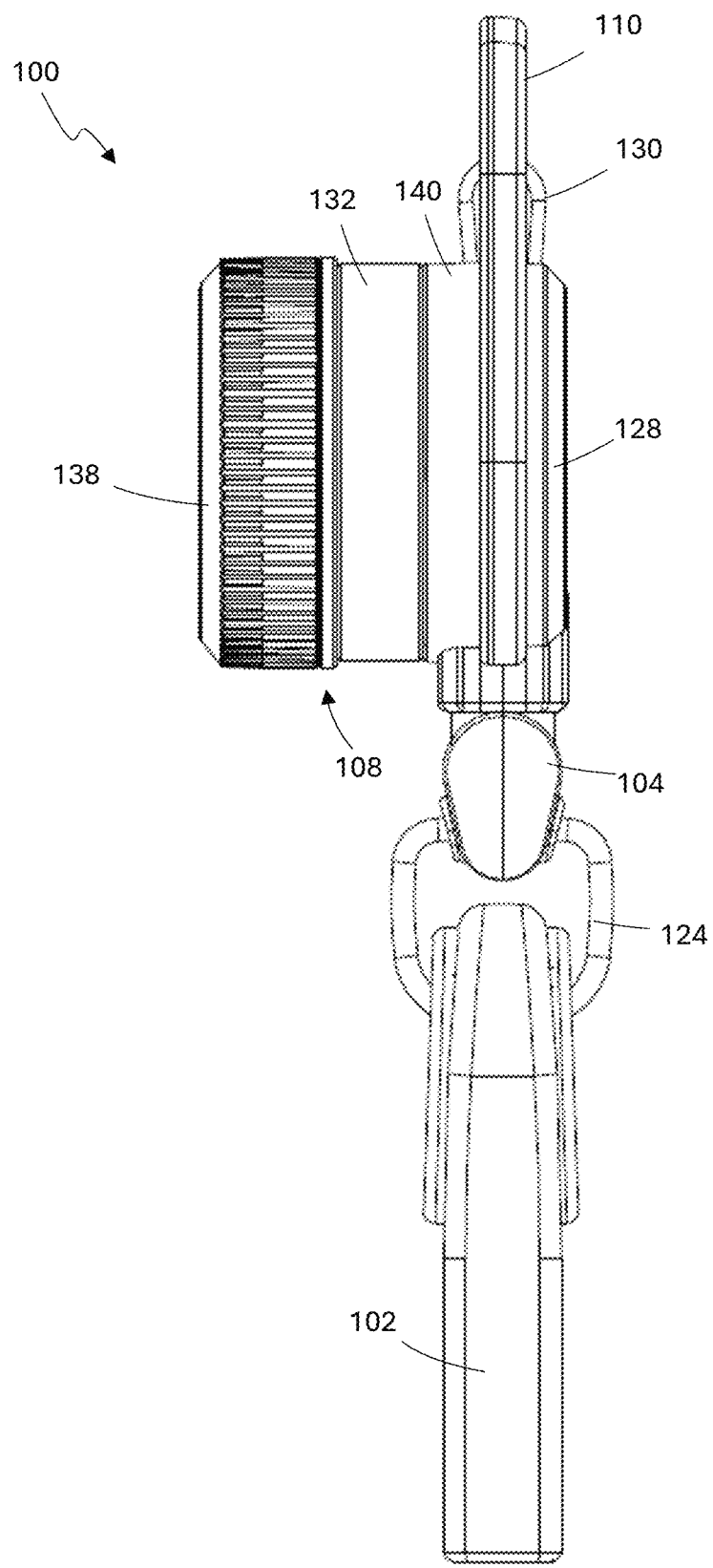
FIG. 7 is an opposite side view of the embodiment depicted in FIG. 6.

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "of" is generally employed in its sense including "and/or" unless the context clearly dictates otherwise.

All numerical designations, such as measurements, efficacies, physical characteristics, forces, and other designations, including ranges, are approximations which are varied up or down by increments of 1.0 or 0.1, as appropriate. It is to be understood, even if it is not always explicitly stated that all numerical designations are preceded by the term "about." As used herein, "about" or "approximately" refers to being within an acceptable error range for the particular value as determined by one of ordinary skill in the art, which will depend in part on how the value is measured or determined. As used herein, the term "about" refers to +10% of the numerical; it should be understood that a numerical including an associated range with a lower boundary of greater than zero must be a non-zero numerical, and the term "about" should be understood to include only non-zero values in such scenarios.

In the following description, for explanatory purposes, numerous specific details are set forth to provide a thorough description of the embodiments of the present invention. It will be apparent to one of ordinary skill in the art that some embodiments may be practices without some of these specific details.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The present invention relates to a grinder and a multifunctional portable device, specifically designed to integrate a grinder with a lighter holder and retractable tether mechanism, all housed within a compact and easily portable form factor. This innovative integration provides convenience and functionality for users who require both a grinding tool and a readily accessible lighter.

Referring to FIGS. 1-9, an embodiment of the portable device 100 comprises several interconnected components, including a lighter housing 102, a swivel mechanism 104, a retractable cord 106, a grinder 108, and a clip 110. Each component is designed to perform a specific function while contributing to the overall utility of the device.

Some embodiments of the present invention include a flexible lighter housing 102 designed to receive a standard lighter. To do so, the flexible lighter housing 102 includes a first end 112, a second end 114, and a body section 116 extending between the two ends. The first end 112 includes an opening 118 sufficiently sized to snugly receive and retain a standard lighter.

Figure 8:
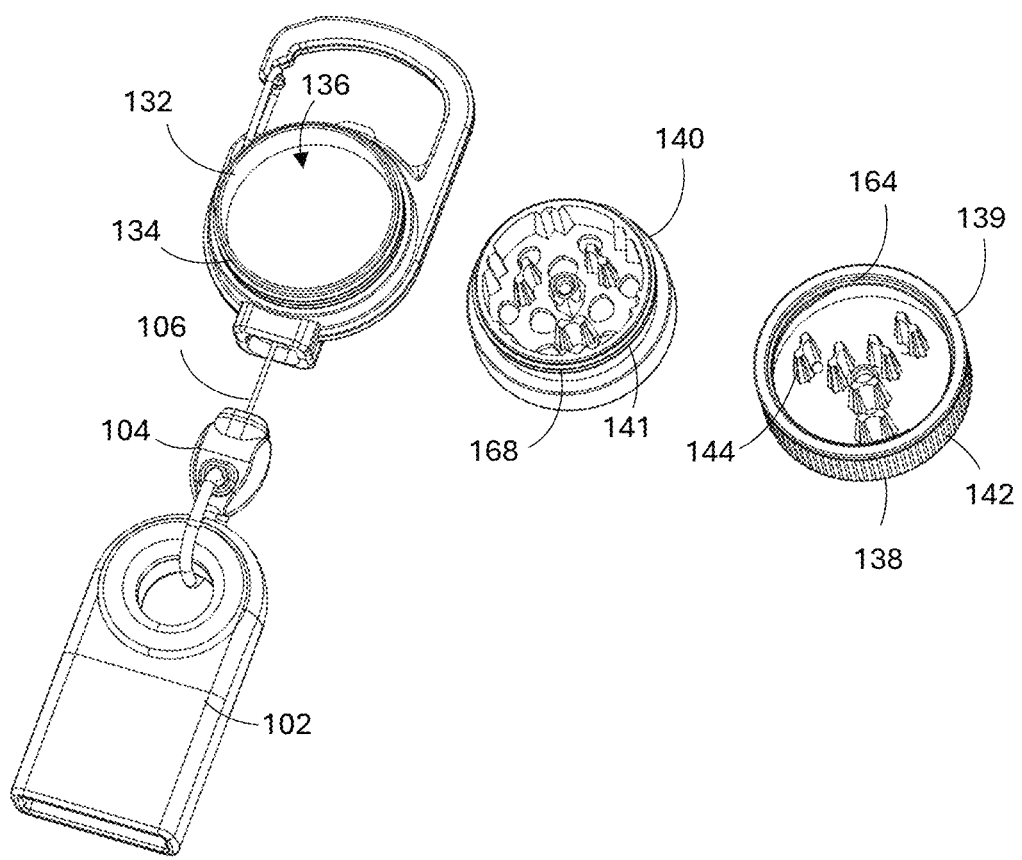
FIG. 8 is an exploded view of an embodiment of the present invention depicting the grinder cap and body section.

The second end 114 includes an attachment point 120 to which a retractable cord 106 is secured as best depicted in FIG. 8. In the illustrated embodiment, the attachment point 120 is in the form of an aperture configured to receive a linkage 124. However, alternative designs of the attachment point 120 and the linkage 124 may be used. In addition, alternative approaches can be implemented to secure the lighter housing 102 to the retractable cord 106.

The lighter housing 102 is made from a durable, flexible material that can withstand regular use and environmental factors. The flexible nature of the lighter housing 102 also ensures a secure fit for various lighter sizes, providing versatility in use.

Some embodiments include a swivel mechanism 104 that connects the retractable cord 106 to the lighter housing 102. This swivel mechanism 104 allows the lighter housing 102 to rotate independently of the rest of the device, providing flexibility in use and ensuring that the lighter remains securely in place during operation.

Figure 9:
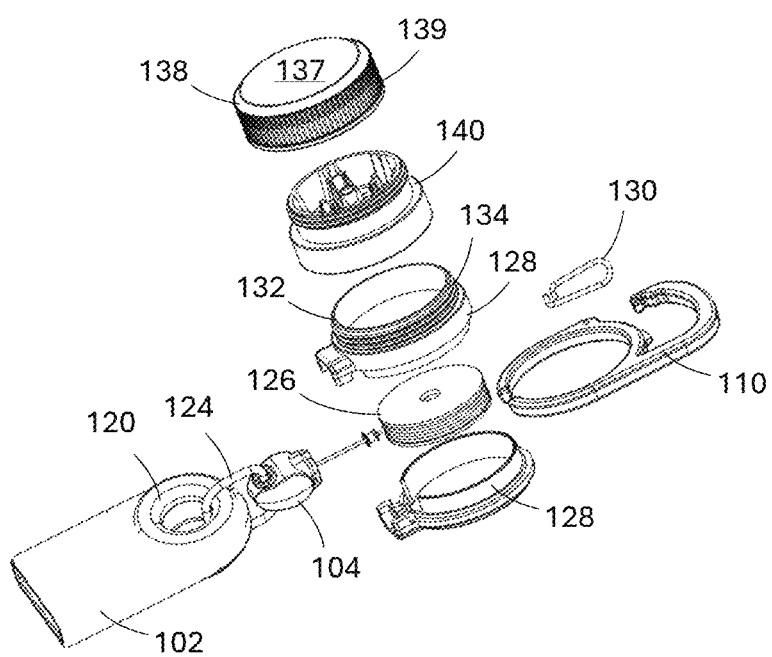
FIG. 9 is a detailed exploded view of an embodiment of the present invention.

The retractable cord 106, which is attached to the lighter housing 102, is also secured to a reel mechanism 126 as illustrated in FIG. 9. The retractable cord 106 and reel mechanism 126 allow the lighter to be extended for use and retracted for storage, maintaining convenience, and reducing the risk of losing the lighter. The reel mechanism 126 is housed within a reel housing 128 that ensures smooth operation of the retractable cord mechanism 106.

The reel housing 128 includes the carabiner clip 110 for easy attachment to a belt loop, bag, or other objects, providing convenient portability and accessibility. The clip 110 is designed to be robust and secure, ensuring that the device remains attached during movement and use. This component enhances the portability and accessibility of the device. The carabiner clip 110 includes a spring-loaded closure 130 to aid in retention of the device. The carabiner clip 110 can be any known coupling link with a known closure 130.

The reel housing 128 further includes a cylindrical extension 132 extending outwardly from a surface of the reel housing 128. The cylindrical extension 132 provides an attachment point to which additional components can be secured to the reel housing 128. In some embodiments, the cylindrical extension 132 further includes a thread 134 configured to engage on one or more additional components. As depicted, the thread 134 resides on an outer/external surface of the cylindrical extension 132 (establishing a male threaded extension) to keep an internal receiving area 136 free from the obstruction of the thread 134. It is contemplated that embodiments could employ alterative mechanisms or approaches for securing components to the reel housing 128 including a female threaded structure.

Some embodiments further include an herb grinder 108 configured to temporarily attach to the reel housing 128. For example, the grinder 108 may include an internal thread (establishing a female thread receipt) complementary to the thread 134 on the cylindrical extension 132. Again, it is contemplated that embodiments could employ alterative mechanisms or approaches for securing the grinder 108 to cylindrical extension 132 including a male threaded structure.

The grinder 108 includes a grinder cap 138 and a body section 140. In some embodiments, the grinder 108 further includes a collection chamber residing below the body section 140 with a solid bottom surface, and the internal receiving area 136 from the cylindrical extension 132 acts as a distinct storage compartment. However, some embodiments do not include an additional collection chamber and the internal receiving area 136 from the cylindrical extension 132 functions as the collection chamber for the grinder 108.

Referring to the exploded views in FIGS. 8-9, the grinder 108 is shown disassembled into multiple parts for clarity. One of the components is the grinder cap 138, which is the removable top part of the grinder 108. Grinder cap 138 includes a solid top surface 139 and a cylindrical wall 139 creating an opening within the grinder cap 138. The cylindrical wall 139 of the grinder cap 138 may include grip enhancing elements 142 for easy handling. As depicted, the grip enhancing elements 142 are a series of ridges however these elements 142 may be in the form of any known friction enhancing features.

Figure 10:
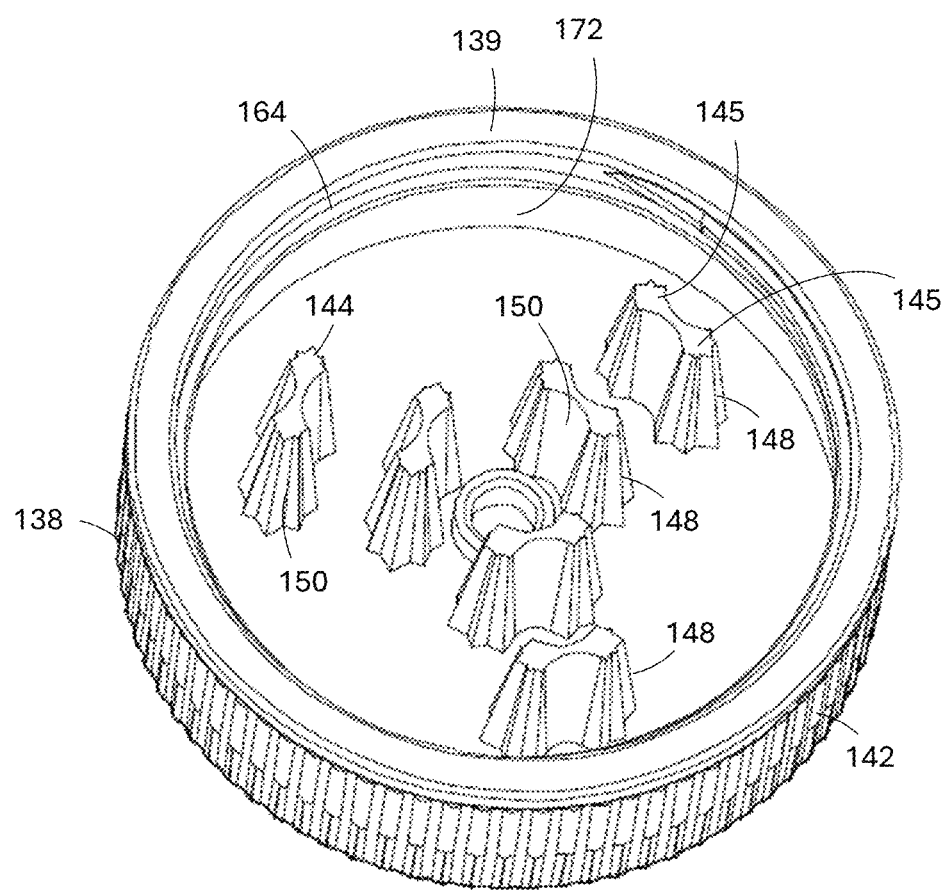
FIG. 10 is a bottom perspective view of an embodiment of the grinder cap.
Figure 11:
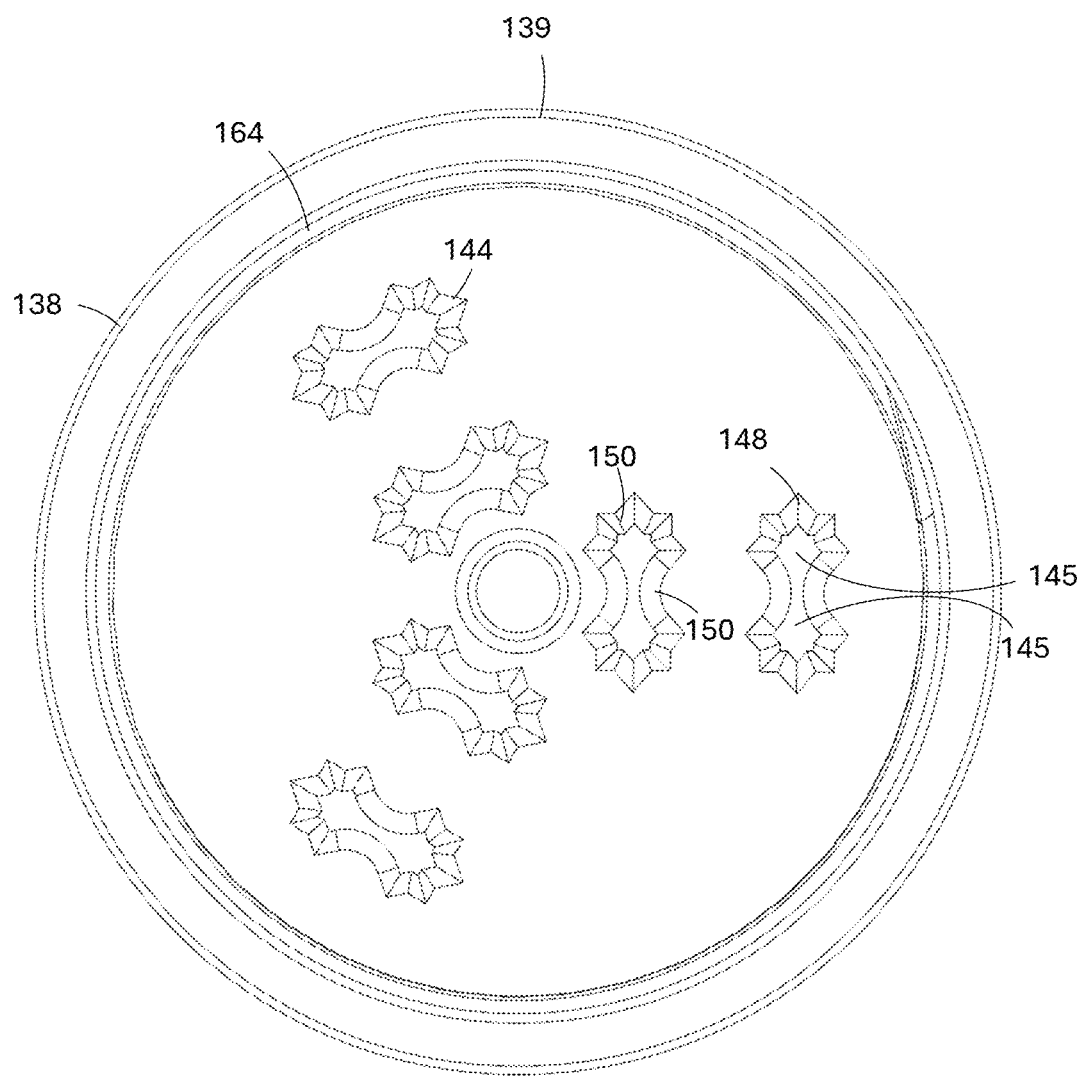
FIG. 11 is a bottom view of an embodiment of the grinder cap.

The grinder cap 138 also includes a plurality of upper grinding blades 144. As shown in FIGS. 8 and 10-11, the upper grinding blades 144 have a unique shape resembling pointed, tooth-like projections arranged in a specific pattern to maximize grinding efficiency. More specifically, some embodiments of the grinder cap 138 have six multi-toothed, tower-shaped dual-connected upper grinding blades 144 arranged in two radially offset rows.

The upper grinding blades 144 are designed to enhance grinding efficiency through their unique structural features. Each upper grinding blade 144 includes a tower-shaped or frustoconical shaped body 145. The body 145 includes vertical sides equipped with sharp teeth 148 that extend along the height of the upper grinding blades 144, providing multiple cutting edges to interact with the material being ground. The dual-connected configuration means that each pair of upper grinding blades 144 shares a base, creating a robust and stable structure that prevents bending or breaking during the grinding process.

The teeth 148 on the upper grinding blades 144 are strategically staggered, ensuring that as the grinder cap 138 rotates, the material is caught and shredded efficiently between the upper grinding blades 144 of the grinder cap 138 and the lower grinding blades 146 of the grinder body 140. Between the sharp teeth 148 along the vertical sides of the upper grinding blades 144, there are catchments or concavities 150 that create a wavy or undulating profile. These catchments 150 are strategically placed indentations that result in a series of alternating peaks and valleys. Structurally, the catchments 150 are precisely engineered to be deep enough to effectively catch and guide the material but not so deep as to weaken the upper grinding blades 144. This balance ensures that the upper grinding blades 144 maintain their structural integrity while providing superior grinding performance. The combination of teeth 148 and catchments 150 serve several critical functions: they increasing the ability of the upper grinding blades 144 to grasp and hold the material securely as the grinder cap 138 rotates; they increase the overall surface area of the upper grinding blades 144, ensuring that more of the material comes into contact with the grinding surfaces, thus enhancing grinding efficiency; the teeth 148 between the catchments 150 act like multiple small blades, slicing through the material with each rotation, while the catchments 150 help direct the material towards the teeth 148, ensuring continuous cutting action; and they help reduce the resistance encountered during grinding, making the process smoother and requiring less effort.

In some embodiments, the upper grinding blades 144 are evenly distributed around the center of the grinder cap 138, forming one or more circular patterns that ensures consistent and thorough grinding of the material. Some embodiments include a first set of upper grinding blades 144 arranged in a first circular pattern around a center of the grinder cap 138. The first set of upper grinding blades 144 includes three pairs of two interconnected blades 144 equidistantly spaced about the circular pattern. A second set of upper grinding blades 144 is also arranged in a circular pattern around the center of the grinder cap 138. The second set of upper grinding blades 144 includes three pairs of two interconnected blades 144 equidistantly spaced about the circular pattern. In addition, each pair of upper grinding blades 144 in the first set of upper grinding blades 144 is radially aligned with one of the pairs of blades 144 in the second set of upper grinding blades 144. The design and arrangement of the upper grinding blades 144, with their vertical bodies 145, dual-connected bases, staggered teeth 148, and catchments 150, provide a high-performance grinding experience, capable of processing herbs and other materials effectively and efficiently.

Figure 12:
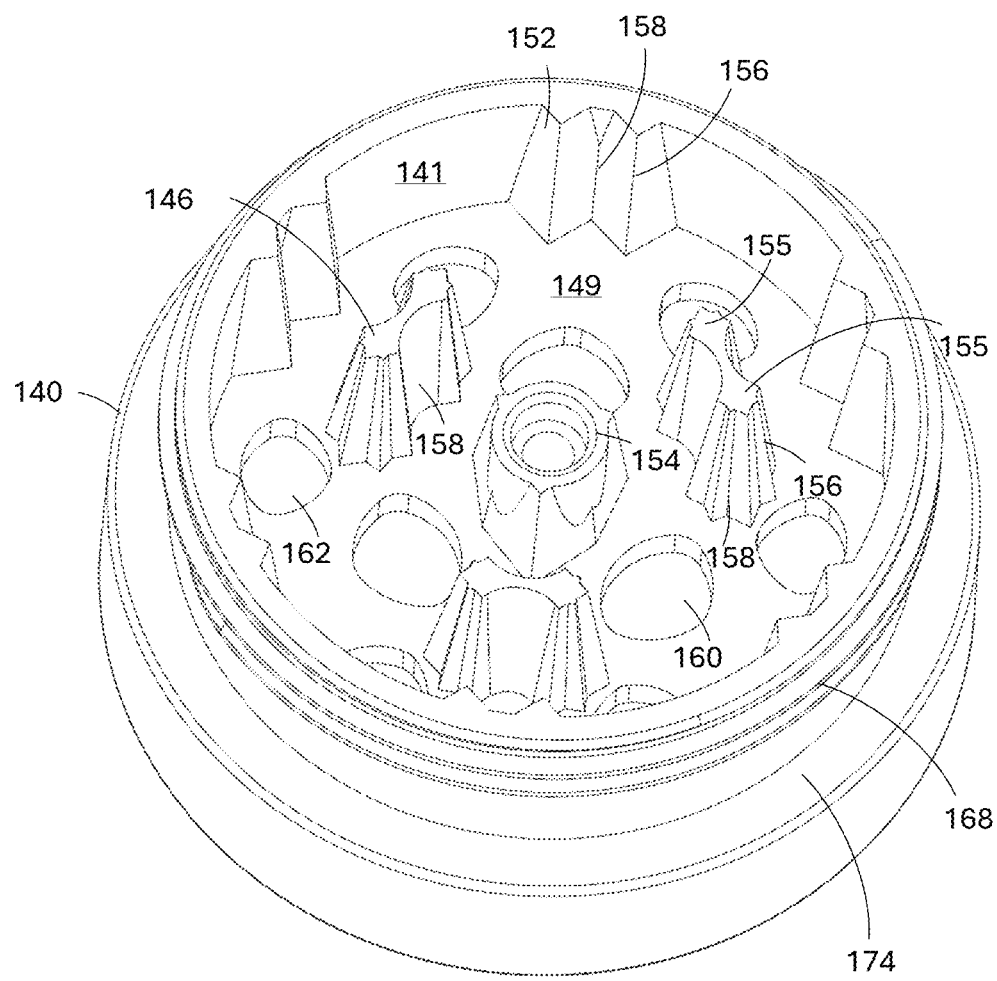
FIG. 12 is a top perspective view of an embodiment of the grinder body section.
Figure 14:
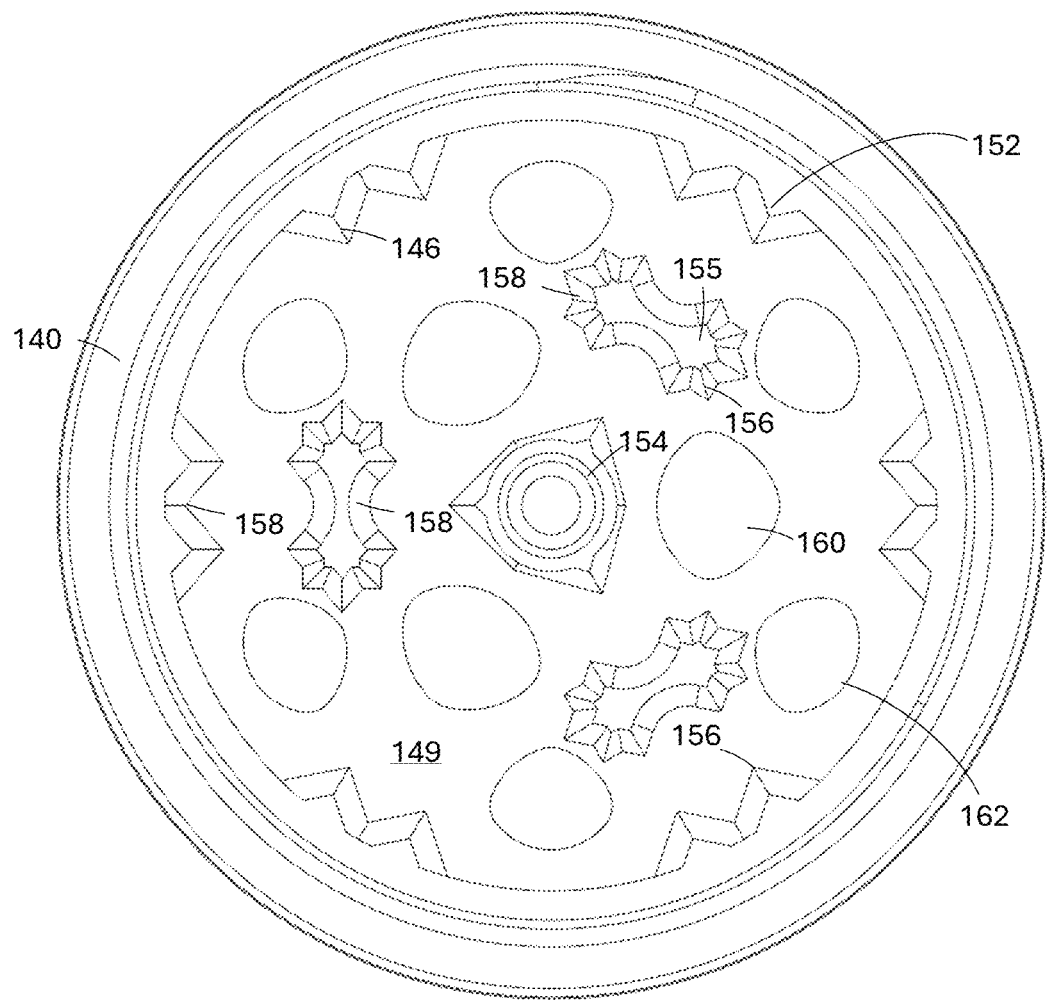
FIG. 14 is a top view of an embodiment of grinder body section.

The body section 140 of the grinder 136 includes a cylindrical wall 141 and a plurality of lower grinding blades 146. In some embodiments, there are three multi-toothed, tower-shaped dual-connected grinding blades 146 distributed evenly at three positions in a circular pattern, six wall blades 152 evenly positioned along the inner circumference of the cylindrical wall 141, and a magnetic pillar 154 located in the center. Lower grinding blades 146 are uniquely shaped and positioned to pass through the rows of the upper blades 144 and operably interact with the upper blades 144. As illustrated in FIGS. 12 and 14, these lower blades 146 have a distinctive configuration with multiple prongs or teeth 156 designed to complement the pattern of the upper blades 144, ensuring thorough and efficient grinding. Like the upper blades 144, the lower blades 146 each include a tower-shaped or frustoconical shaped body 155. Each blade 146 and each wall blades 152 has vertical sides equipped with sharp teeth 156 that extend along the height of the blades 146, 152 thereby providing multiple cutting edges to interact with the material being ground. The dual-connected configuration means that each pair of blades 146 shares a base, creating a robust and stable structure that prevents bending or breaking during the grinding process.

The teeth 156 on the blades 146, 152 are also strategically staggered, ensuring that as the grinder cap 138 rotates, the material is caught and shredded efficiently between the interlocking blades 144 of the grinder cap 138 and the blades 146, 152 of the grinder body 140. Between the teeth 156 along the vertical sides of the blades 146, 152, there are catchments or concavities 158 that create a wavy or undulating profile. These catchments 158 are strategically placed indentations that result in a series of alternating peaks and valleys. The catchments 158 provide the same functions as those described in reference to catchments 150.

When the cap 138 is rotated, the herbs inside the body section 140 are rotated by the grinding blades 144 on the cap 138, passing through the lower blades 146, wall blades 152, and magnetic pillar blade 154. During this process, the blades 144, 146, 152 and 154 operably compress and grind material into fragments.

Figure 15:
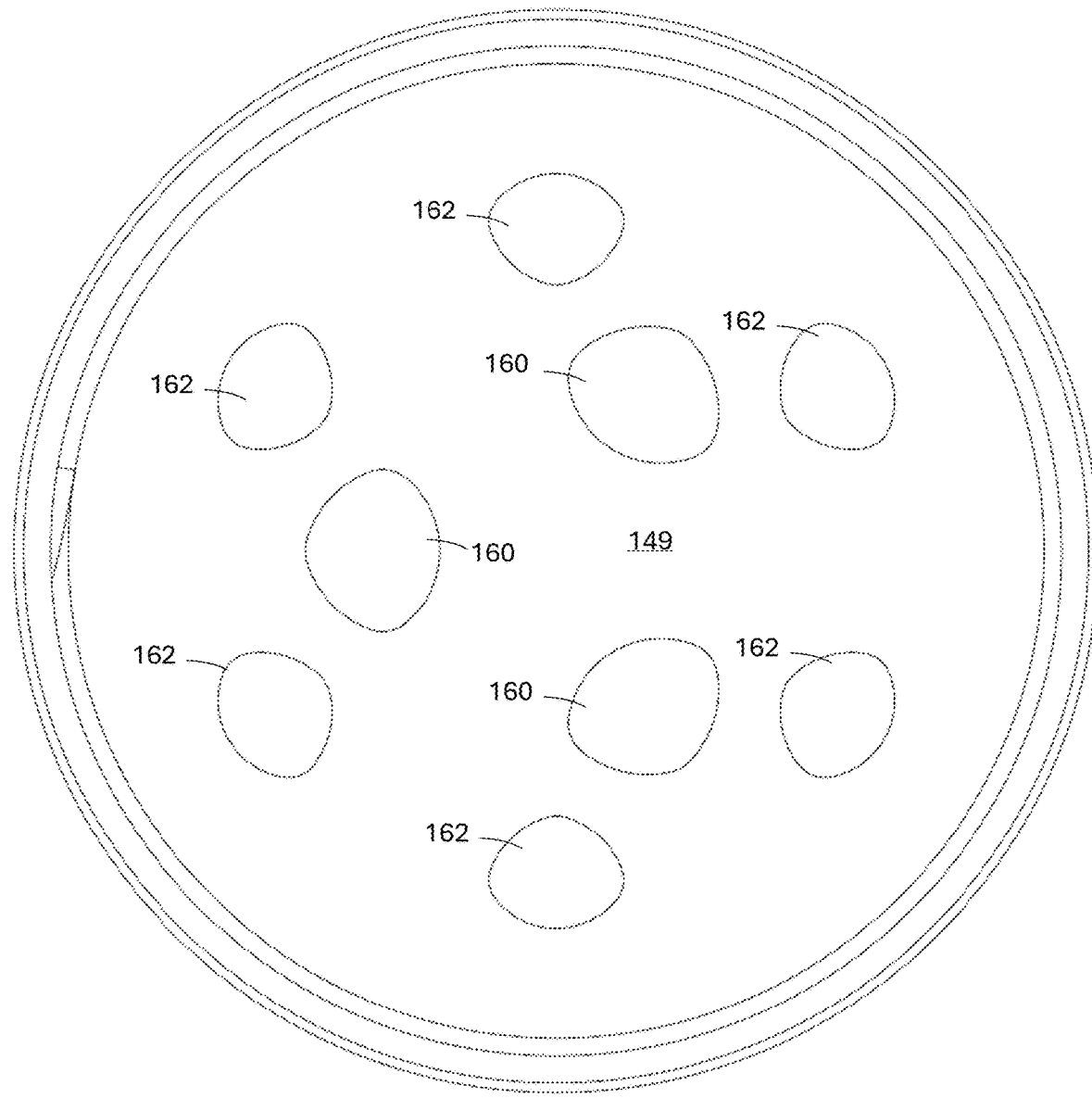
FIG. 15 is a bottom view of an embodiment of grinder body section.

The bottom wall 149 of the body section 140 also features apertures 160, 162 that are uniquely shaped and strategically spaced to facilitate the passage of ground material. FIGS. 14-15 depict these apertures 160, 162 as oval-shaped holes arranged in a circular pattern, ensuring optimal flow, and preventing clogging. However, some embodiments may have circular apertures 160, 162 or apertures 160, 162 of alternative shapes.

A first set of apertures 160 are larger than a second set of apertures 162. The first set are positioned between the lower grinding blades 146 in roughly the same radial location from the center of the body section 140. The second set of apertures 162 are smaller than apertures 160 and are arranged on either side of the lower grinding blades 146 at a radial distance between blades 146 and blades 152.

Figure 13:
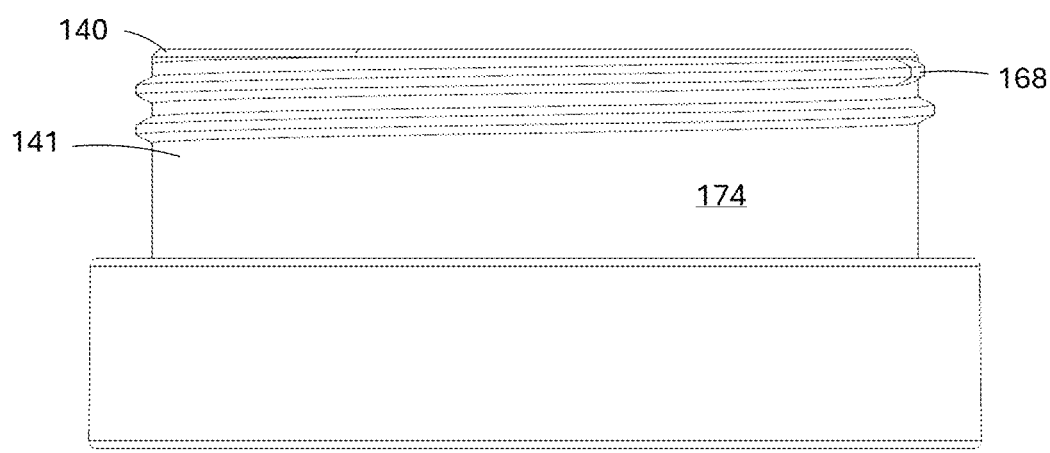
FIG. 13 is an elevation view of an embodiment of grinder body section.

As previously noted, the grinder cap 138 and the body section 140 are configured to rotate relative to each other. To do so, the grinder cap 138 features internal thread 164 located on an inner surface of wall 139 and the body section 140 includes a thread 168 located on an outer surface of wall 141. As best depicted in FIGS. 10 and 13, the thread 164 does not extend the full length of the wall 139 and the thread 168 does not extend the full length of the wall 141 thereby creating thread-free sections 172, 174 of the walls 139, 141, respectively. In some embodiments, the thread 164 starts proximate the free end of the wall 139 and the thread 168 starts proximate the free end of the wall 141. The thread-free space 172 is located between the end of the thread 164 and the end of the wall 139 that is opposite the free end. In addition, the thread-free space 172 is greater than the longitudinal expanse of the thread 168 (i.e., the thread length) on the wall 141. Likewise, the thread-free space 174 is between the end of the thread 168 and the end of the wall 141 that is opposite the free end, and the thread-free space 174 is greater than the thread length of the thread 164 on the grinder cap 138. This design ensures that when the thread 164 of the grinder cap 138 reaches the end of the thread 168 on the grinder body 140 and enters the thread free space 174, the cap 138 can continue to rotate freely without engaging the thread 168 on the grinder body section 140. Explained in another way, the cap 138 can be threaded onto the grinder body 140 and with continued rotation, the thread 164 on grinder cap 138 will disengage the thread 168 on body section 140. Once the respective threads 144, 146 reach the thread-free spaces 172, 174, the grinder cap 138 can rotate freely in either direction without the threads 144, 146 engaging each other.

Moreover, the central magnetic pillar 154 within body section 140 is configured to magnetically attract grinder cap 138. In some embodiments, the grinder cap 138 is comprised of a magnetic or magnetically attracted material or includes such a material therein. The magnetic pillar magnetically attracts the grinder cap 138, ensuring that the cap's thread 164 remains below the body section's thread 168 and in the thread-free space 174 while allowing the cap 138 to rotate relative to the body section 140 for grinding. This thread arrangement allows for continuous grinding without the cap 138 detaching. A user can overcome the magnetic force by pulling the grinder cap 138 away from the body section 140 and rotating the grinder cap 138 in an opposite direction to disengage the grinder cap 138 from the body section 140.

Some embodiments of the device include an intermediary extension. The intermediary extension includes a corresponding thread configured to engage the thread on the cylindrical extension 132 of the reel housing 128. The intermediary extension can be configured to increase the distance between the surface of the reel housing 128, which is effectively the bottom surface of the grinder 108 or it can be used to increase the size of the storage compartment.

The novelty of this device lies in the seamless integration of a grinder within a portable, multifunctional tool. The combined functionality of the carabiner clip, grinder, retractable cord, and lighter holder provides users with a convenient, all-in-one solution for grinding materials and keeping a lighter accessible. The thoughtful design ensures that each component operates efficiently without compromising the device's portability or ease of use. Additionally, the unique design of the grinder, its grinding blades, apertures, and the threading mechanism enhances the grinding efficiency and usability of the device.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A grinder, comprising:
    a grinder cap, the grinder cap including:
        a solid top surface and a cylindrical wall extending from the top surface;
        a plurality of upper grinding blades secured to the top surface;
        a thread located on an inner surface of the cylindrical wall of the grinder cap, wherein the thread extends partially along a length of the inner surface of the cylindrical wall such that the inner surface of the cylindrical wall includes a thread-free section;
    a grinder body, the grinder body including:
        a bottom top surface and a cylindrical wall extending from the bottom surface;
        a plurality of lower grinding blades secured to the bottom surface;
        a thread located on an outer surface of a cylindrical wall of the grinder body, wherein the thread extends partially along a length of the outer surface of the cylindrical wall such the outer surface of the cylindrical wall includes a thread-free section;
    wherein the grinder cap can be threaded onto the grinder body and continued rotation in a first direction causes the thread on the grinder cap to reach the thread-free section on the grinder body and the thread on the grinder body to reach the thread-free section on the grinder cap, thereby allowing the grinder cap to rotate freely relative to the grinder body without the thread on the grinder cap engaging the thread on the grinder body;
    a central magnetic pillar within the grinder body that magnetically attracts the grinder cap, ensuring that the internal thread of the grinder cap remains in the thread-free section of the grinder body thereby allowing the grinder cap to freely rotate relative to the grinder body;
    each upper grinding blade having a tower-shaped body with vertical sides equipped with teeth that extend along the height of the blade and catchments between the teeth;
    each lower grinding blade having a tower-shaped body with vertical sides equipped with teeth that extend along the height of the blade and catchments between the teeth;
    wherein the upper grinding blades and lower griding blades are arranged to operably compress and grind material into fragments during rotation of the grinder cap relative to the grinder body.

2. The grinder of claim 1, wherein the grinder is configured to temporarily attach to a multifunctional portable device having:
    a lighter housing configured to receive a lighter;
    a retractable cord secured to a reel mechanism and to the lighter housing, the retractable cord allowing the lighter to be extended for use and retracted for storage;
    a reel housing configured to house the reel mechanism; and
    a clip attached to the reel housing for securing the device to an object.

3. The grinder of claim 1, wherein the thread-free section on the grinder body has a length that is greater than a thread length of the thread on the grinder cap and the thread-free section on the grinder cap has a length that is greater than a thread length of the thread on the grinder body.

4. The grinder of claim 1, wherein the grinder cap includes:
- a first set of the upper grinding blades arranged in a first circular pattern around a center of the grinder cap, wherein the first set of upper grinding blades include three pairs of two interconnected blades equidistantly spaced about the first circular pattern;
- a second set of the upper grinding blades arranged in a second circular pattern around the center of the grinder cap, wherein the second set of upper grinding blades include three pairs of two interconnected blades equidistantly spaced about the second circular pattern; and
- wherein each pair of blades in the first set of upper grinding blades is radially aligned with one of the pairs of blades in the second set of upper grinding blades.

5. The grinder of claim 1, wherein the grinder body includes:
- a set of the lower grinding blades arranged in a circular pattern around a center of the grinder body, wherein the set of lower grinding blades includes three pairs of two interconnected blades equidistantly spaced about the circular pattern;
- a set of wall blades equidistantly spaced about a circumference of a cylindrical wall of the grinder body; and
- a first set of apertures arranged in a circular pattern around the center of the grinder body and a second set of apertures arranged in a circular pattern around the center of the grinder body.

6. The grinder of claim 5, wherein each of the first set of apertures and each of the second set of apertures are non-circular and each of the first set of apertures is larger than each of the second set of apertures.

\* \* \* \* \*